United States Patent

Meulle et al.

(12) United States Patent
(10) Patent No.: US 9,234,909 B2
(45) Date of Patent: Jan. 12, 2016

(54) METHOD AND SYSTEM FOR DETERMINING AN AIRSPEED OF AN AIRCRAFT

(71) Applicant: THALES, Neuilly-sur-Seine (FR)

(72) Inventors: Guillaume Meulle, Toulouse (FR); Thomas Caussat, Montauban (FR); Arnaud Beaufils, Fonsorbes (FR); Christophe Pierre, Fontenilles (FR)

(73) Assignee: Thales, Courbevoie (FR)

( * ) Notice: Subject to any disclaimer, the term of this patent is extended or adjusted under 35 U.S.C. 154(b) by 7 days.

(21) Appl. No.: 14/268,816

(22) Filed: May 2, 2014

(65) Prior Publication Data

US 2014/0330458 A1 Nov. 6, 2014

(30) Foreign Application Priority Data

May 3, 2013 (FR) ..................................... 13 01029

(51) Int. Cl.
  *G01P 5/00* (2006.01)
  *B64C 19/00* (2006.01)
(52) U.S. Cl.
  CPC .. *G01P 5/00* (2013.01); *B64C 19/00* (2013.01)
(58) Field of Classification Search
  CPC .................................. B64C 19/00; G01P 5/00
  USPC ................ 701/11, 14; 340/968; 342/104, 115
  See application file for complete search history.

(56) References Cited

U.S. PATENT DOCUMENTS 6,647,774 B1 * 11/2003 Youngquist ................ 73/170.02
6,977,608 B1    12/2005 Anderson et al.
7,116,266 B1 * 10/2006 Vesel et al. ...................... 342/30
2008/0168835 A1 *  7/2008 Lassouaoui et al. ....... 73/170.11
2009/0134981 A1    5/2009 Shafaat et al.

FOREIGN PATENT DOCUMENTS

EP    2348285 A2    7/2011

OTHER PUBLICATIONS

C.C. Lefas, "Real-Time Wind Estimation and Tracking with Transponder Downlinked Airspeed and Heading Data", IEEE Transactions on Aerospace and Electronic Systems, Mar. 1, 1987, pp. 169-174, vol. AES-23, No. 2, IEEE Service Center, Piscataway, NJ, USA, XP011168476.

\* cited by examiner

*Primary Examiner* — Marthe Marc-Coleman
(74) *Attorney, Agent, or Firm* — Baker & Hostetler LLP

(57) ABSTRACT

A method and system for determining an airspeed of an aircraft, known as assisted aircraft, comprises: a) determining a position; b) measuring a ground speed; c) receiving a plurality of messages from a plurality of other assisting, aircraft, each message containing a first item of information, indicating a position of an assisting aircraft, and a second item of information, indicating a wind speed at the position; d) estimating a wind speed at the position of the assisted aircraft by interpolating the wind speed values at the positions of the assisting aircraft obtained in step c); and e) computing a true speed of the assisted aircraft by using the vector difference between its ground speed, measured in step b), and the wind speed estimated in step d). The method can check operation of an anemometric subsystem aboard an aircraft, to compensate for any malfunction and/or to enable automatic piloting.

19 Claims, 2 Drawing Sheets

METHOD AND SYSTEM FOR DETERMINING AN AIRSPEED OF AN AIRCRAFT

CROSS-REFERENCE TO RELATED APPLICATION

This application claims priority to foreign French patent application No. FR 1301029, filed on May 3, 2013, the disclosure of which is incorporated by reference in its entirety.

FIELD OF THE INVENTION

The invention relates to a method for determining an airspeed (for example the "true" speed TAS, for True Air Speed, and/or the Calibrated Air Speed CAS) of an aircraft, as well as to a system for implementing such a method. The invention also relates to the use of this method for detecting a fault in an anemometric subsystem (based on a Pitot or Pitot-static probe or a LIDAR and associated pressure sensors) of an aircraft, to compensate for such a fault or even to provide automatic piloting of the aircraft.

The invention mainly applies to aeroplanes, but can also be useful for other aircraft such as helicopters or gliders.

BACKGROUND

The CAS is a fundamental parameter of flight control, because it represents the ability of an aeroplane to maintain flight. The CAS is an indispensable item of information for the operation of the autopilot systems.

Conventionally, conventional speed is measured by subsystems of on-board sensors and probes, of "Pitot or Pitot-static" type (which also provide altitude information) or of LIDAR type, and their associated pressure sensors. In the event of a measurement subsystem fault, altitude information can be obtained independently, for example using a satellite navigation system (GNSS). On the other hand, no satisfactory solution exists at this time for determining the airspeed of the aircraft in such an eventuality. Aircraft constructors indicate the procedures to be followed in this case, to enable manual piloting of the aircraft.

The document EP 2 348 285 discloses the possibility of computing the airspeed of an aircraft on the basis of knowledge of its ground speed—obtained using a satellite navigation system—and the wind speed. In the event of a fault in the anemometric subsystems, this latter item of information can be estimated on the basis of statistical data or be communicated by a ground station. This solution is not very satisfactory because the estimate of the wind speed value risks being marred by significant uncertainty.

The article by A.C. in't Veld et al. "*Real-time Wind Profile Estimation using Airborne Sensors*", AIAA Guidance Navigation and Control Conference, 8-11 Aug. 2011, Portland, Oreg., United States (AIAA 2011-6662) discloses a method for estimating a wind speed profile as a function of altitude in a TMA (Terminal Manoeuvring Area) by Kalman filtering of data acquired by sensors aboard aircraft and transmitted according to the ADS-B protocol. The aim of this method is not to compensate for the fault in or the absence of the anemometric subsystems, but to know the local wind speed at different altitudes from that at which the aircraft is proceeding.

SUMMARY OF THE INVENTION

The invention aims to overcome the aforementioned drawbacks of the prior art and more specifically to procure a method and a system making it possible to determine the airspeed of an aircraft in a reliable way, even in the event of a fault in the on-board subsystems. This method and system also make it possible to check that these subsystems are operating correctly, and to detect any fault therein.

A subject of the invention enabling the attainment of this goal is a method for determining an airspeed of an aircraft, called assisted aircraft, comprising the following steps:
   a) determining a position of said assisted aircraft;
   b) measuring a ground speed of said assisted aircraft;
   c) receiving a plurality of messages from a plurality of other aircraft, known as assisting aircraft, each said message containing: a first item of information, indicating a position of a said assisting aircraft, and a second item of information, indicating a wind speed at said position;
   d) estimating a wind speed at the position of said assisted aircraft by interpolating the wind speed values at the positions of said assisting aircraft obtained in said step c); and
   e) computing a true speed TAS of said assisted aircraft by using a vector difference between its ground speed, measured in said step b), and the wind speed estimated in said step d).

The method can also comprise the following step:
   f) computing, based on the true speed computed in said step e), at least one parameter chosen from among a conventional or Calibrated Air Speed CAS and a Mach number.

According to particular embodiments of the method of the invention:

Said steps a) and b) can be implemented by means of at least one device aboard said assisted aircraft and chosen from among: a GNSS receiver and an inertial control centre.

Said messages can be broadcast by said assisting aircraft. In particular, said messages can be broadcast by said assisting aircraft and received by said assisted aircraft according to the ADS-B protocol.

Said second item of information can comprise a ground speed measurement and an airspeed measurement for said assisting aircraft, from which said wind speed can be deduced.

At least said steps d) and e) can be performed by a processor aboard said assisted aircraft.

Said step d) can be implemented by kriging.

Said steps c) and d) can comprise: receiving a predefined number n of said messages, extracting the first and second items of information contained in these messages and storing them in a queue of length n; computing a first estimation of said wind speed by interpolating from the information stored in said queue; and on subsequently receiving other said messages, storing the information contained in said queue and concomitantly removing older information from said queue, according to the first in first out principle; and computing a new estimation of said wind speed by interpolating from the information stored in the queue modified thus.

The method can also comprise determining an uncertainty parameter of said airspeed of said assisted aircraft.

Said messages can also contain a third item of information representing the pressure at sea level corresponding to the position of each said assisting aircraft, in which case the method can also include a step of estimating the pressure at sea level corresponding to the position of said assisted aircraft by interpolating said third items of information.

Another subject of the invention is a method for checking the operation of an anemometric subsystem aboard an aircraft, known as assisted aircraft, including the following steps:

A) measuring an airspeed of said assisted aircraft by means of said anemometric subsystem;
B) determining said airspeed of said aircraft, as well as its uncertainty parameter, by using a method as described above; and
C) considering that said anemometric subsystem is faulty when the difference between said measured speed and said determined speed exceeds said uncertainty parameter.

Yet another subject of the invention is the use of a method for determining an airspeed of an aircraft as described above in the event of a fault in an anemometric subsystem aboard said assisted aircraft.

Yet another subject of the invention is a method for automatic piloting of an aircraft, called assisted aircraft, including the following steps:

i) determining an airspeed of said assisted aircraft as well as an uncertainty parameter of said speed by means of a method as described above;
ii) correcting the upper and lower airspeed limits permitted for the flight of said aircraft while taking account of said uncertainty parameter; and
iii) using an autopilot system to maintain the airspeed of said assisted aircraft within said corrected upper and lower limits.

Yet another subject of the invention is a system for determining an airspeed of an aircraft, called assisted aircraft, by using a method as described above, comprising:

a device for determining the position and ground speed of said aircraft;
a receiver for receiving a plurality of messages from a plurality of other aircraft, called assisting aircraft, each said message containing: a first item of information, indicating a position of a said assisting aircraft, and a second item of information, indicating a wind speed at said position; and
a processor configured or programmed for estimating a wind speed at the position of said assisted aircraft by interpolating wind speed values at the positions of said assisting aircraft and for computing an airspeed of said assisted aircraft by using a vector difference between its ground speed and the estimated wind speed.

Such a system can also comprise an anemometric subsystem for determining a wind speed or an airspeed of the aircraft, as well as a transmitter for broadcasting a message containing: a first item of information, indicating a position of said aircraft, and a second item of information, indicating a wind speed at said position.

Said receiver, and where applicable said transmitter, can be an ADS-B receiver and transmitter respectively.

BRIEF DESCRIPTION OF THE DRAWINGS

Other features, details and advantages of the invention will become apparent upon reading the description, which is written with reference to the appended drawings provided by way of example, in which.

DETAILED DESCRIPTION

Figure 1:
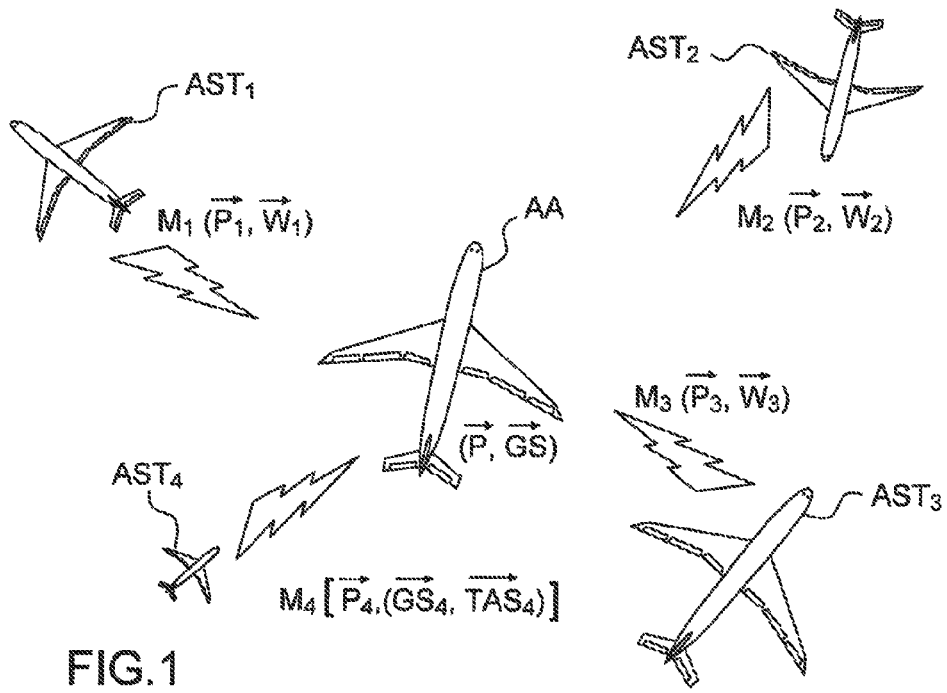
FIG. 1 shows a general illustration of a method according to the invention.

As illustrated in FIG. 1, a method according to the invention allows an aircraft AA, which will subsequently be referred to as "assisted aircraft", to compute an estimation of the wind speed that it experiences, and to deduce its airspeed therefrom, using messages $M_1$-$M_4$ that it receives from other (known as "assisting") aircraft $AST_1$-$AST_4$. Each of these messages, $M_i$, essentially contains two items of information: a first item of dated position (latitude, longitude and altitude at a given instant) information concerning the assisting aircraft $AST_i$, $\vec{P}_i$ ($\vec{P}_1$ à $\vec{P}_4$ to $\vec{P}_1$ à $\vec{P}_4$ in the example illustrated in the figure), that said assisting aircraft determines in a conventional way using a satellite navigation system (GNSS for Global Navigation Satellite System, for example GPS) or an inertial control centre, and a second item of information related to the wind speed experienced by said assisting aircraft. This second item of information can be a direct measurement of the wind speed (in terms of intensity and direction) $\vec{W}_i$; such is the case for the messages $M_1$-$M_3$, transmitted by the assisting aircraft $AST_1$, $AST_2$ and $AST_3$ In a variant, as in the case of the message $M_4$ transmitted by the assisting aircraft $AST_4$, a joint measurement of the ground speed, $\vec{GS}_4$, and of the "true" airspeed, $\vec{TAS}_4$, may be involved. In this case, the wind speed experienced by the aircraft $AST_4$ can be determined by using the difference between these two vectors $\vec{W}_4 = \vec{GS}_4 - \vec{TAS}_4$. The second item of information is determined by each assisting aircraft using its anemometric and/or anemobarometric subsystems (Pitot-static probes or LIDARs and associated sensors) and a satellite or inertial navigation system.

The messages $M_i$ can contain other information fields, and notably an identifier of the transmitting aircraft and, where applicable, a validity field for the transmitted data (the latter is not necessary if provision has been made for the transmission to be carried out only when the data is considered valid).

The messages can be broadcast directly by the aircraft, for example by means of the ADS-B protocol, known from the prior art. Other protocols can also be used, for example providing for the involvement of a relay station on the ground and/or setup of a link between the transmitting (assisting) aircraft and the receiving (assisted) aircraft.

Figure 2:
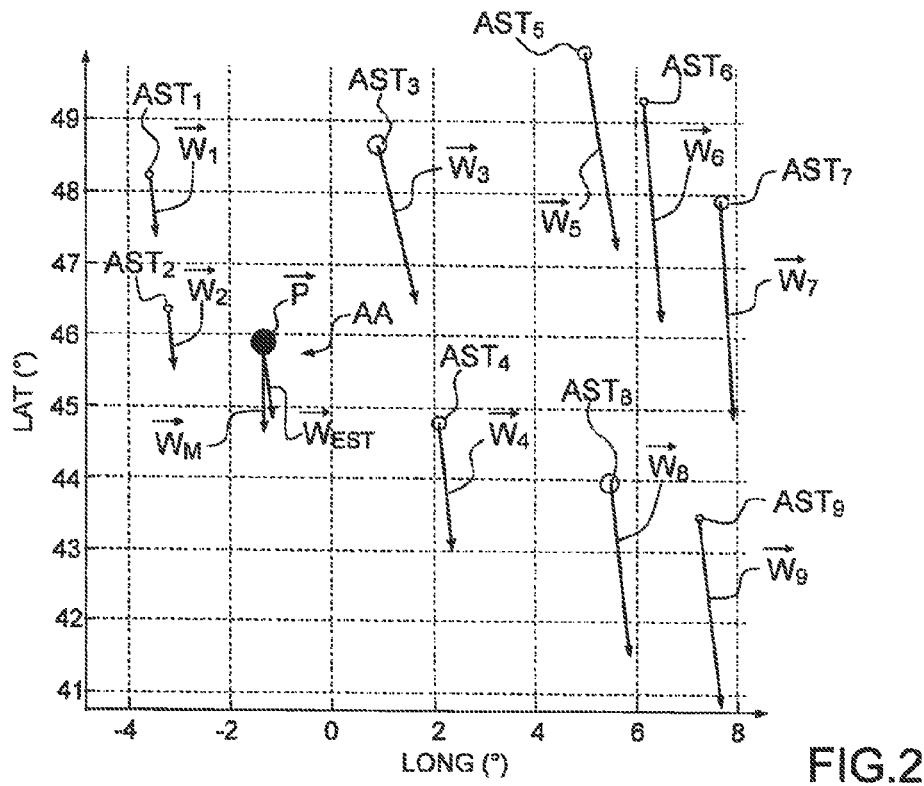
FIG. 2 shows the step of interpolating the wind speed.

The data transmitted by the assisting aircraft perform sampling of the vector field representing the speed and direction of the wind in a region of the atmosphere surrounding the assisted aircraft AA. This is shown (in two dimensions: longitude LONG and latitude LAT, both expressed in degrees "°"; most of the time, in reality, the altitude will also be taken into consideration) in FIG. 2, which shows a situation where nine assisting aircraft $AST_1$-$AST_9$ communicate their (vectorial) wind speeds $\vec{W}_1$-$\vec{W}_9$ to an assisted aircraft AA, located in the position $\vec{P}$; in FIG. 2, each assisting aircraft is represented by a circle of a size directly proportional to the recency of the supplied information. Aboard the assisted aircraft AA, a processor estimates the local vectorial wind speed, $\vec{W}_{EST}$, by interpolating the communicated values $\vec{W}_1$-$\vec{W}_9$. Preferably, the interpolation is carried out in four dimensions: three spatial dimensions and one temporal dimension. By way of comparison, the vector $\vec{W}_M$ represents the wind speed measured by an anemometric subsystem of the aircraft AA; it can be observed that the estimation error is particularly small.

The interpolation can be computed, preferably, by the kriging algorithm, known per se. However, other methods can also be used, notably linear interpolation, cardinal spline interpolation, nearest-neighbour approximation, etc.

Advantageously, the interpolation algorithm (kriging or other) can be fed with input data by a FIFO ("first in first out") queue of constant length, handled in the following way:

in a start-up step, the data received as input feed the queue until it reaches a defined length (N elements or items of data);

the interpolation algorithm is applied to these N elements to give a first estimation of the wind speed;

each time a new item of data is acquired, it is incorporated into the queue, whereas the oldest element is removed; the interpolation algorithm is applied to the new set of N data items obtained thus.

The processor also knows the ground speed of the assisted aircraft, GS, which is determined using a GNSS receiver and/or an inertial control centre, or else which is measured by a ground radar station and transmitted to the processor by a radio link. The true airspeed is therefore computed by using the vector difference between the ground speed and the estimated wind speed: $\vec{TAS} = \vec{GS} - \vec{W}_{EST}$.

Most of the time, knowledge of the TAS is not enough, and it is necessary to compute the conventional or corrected speed CAS, which is known per se. For example, the following procedure can be used:

1) Determining the scalar TAS: $TAS = \sqrt{\vec{TAS} \cdot \vec{TAS}}$, where · is the scalar product operator.

2) Measuring the temperature at the current altitude of the aeroplane or computing it from the standard atmosphere and from a delta ISA preferably supplied by a weather forecasting organization. This temperature is denoted T.

2) Computing the Mach number: $M = TAS/\sqrt{\gamma r T}$, where $\gamma = 1.4$ and r is the ideal gas constant (r=287.053 SI units—international system of units).

3) Computing $qcp = (1+0.2M^2)^{3.5} - 1$; this quantity represents the difference between the dynamic pressure and the static pressure, related to the pressure at sea level.

4) Computing a correction factor with a value of $$cf = \left(\frac{288.15 - 0.0019812 Zp}{288.15}\right)^{5.256114}$$

if the pressure altitude Zp—expressed in feet (ft)—is below the altitude of the tropopause Tropo_Alt (preferably supplied by a weather forecasting organization or by default entered into a flight management system, FMS) and $$cf = 0.22353 e^{\frac{Tropo\_Alt - Zp}{20804.945}}$$

otherwise.

5) Computing the (scalar) CAS in knots (kts) by applying the following formula:

$$CAS = 661.4748 \sqrt{5(1 + qcp \times cf)^{\frac{2}{7}} - 1}.$$

In certain embodiments it is possible to stop at step 2, i.e. at the computing of the Mach number.

Advantageously, the precision of the estimation is known and defined by an uncertainty parameter $\sigma$ such that there is a probability of N % (N being a predefined value below 100, for example 95% or 99%) that the difference between the actual value of the CAS and its estimated value lies in a range $[-\sigma, +\sigma]$. The value of the uncertainty parameter $\sigma$ can be supplied by the interpolation algorithm (kriging or other), and/or be determined experimentally.

The computing of the Mach number and/or the CAS requires knowledge of the pressure altitude Zp of the assisted aircraft. This parameter can be known from the on-board sensors, even in the presence of a fault on a path preventing measurement of the airspeed. Other embodiments make it possible to retrieve this information even if it is not supplied by the on-board sensors.

A first possibility consists in computing Zp on the basis of the height relative to the ground, measured par GNSS, the local pressure at sea level, supplied for example by a weather forecasting organization via a ground station, and the model of development of the pressure with the altitude of the standard atmosphere.

A second possibility consists in using an interpolation procedure, as for the determination of the wind speed. In this case, the assisting aircraft also transmit a third item of information representing their local pressure at sea level; this item of information is received by the assisted aircraft and used to compute, by interpolation (kriging or other), the pressure at sea level at the latitude and longitude of said assisted aircraft. The third item of information can directly consist of a pressure value ("QNH"), or of quantities enabling this value to be determined by means of a computation (for example, a height relative to the ground and a local pressure perceived by the aircraft).

Several possible applications exist for a method according to the invention as described above.

Firstly, it can be used to compensate for a fault in the on-board anemometric subsystems and in such an eventuality to allow manual, or even automatic, piloting of the aircraft in conditions of maximum safety. Where automatic piloting is concerned, the uncertainty parameter $\sigma$ of the CAS estimation can be used to place an additional limit on the flight envelope. If $V_{LS}$ and $V_{MO}$ are the lower and upper limits of the flight envelope respectively, it is possible to regulate the autopilot system so that it maintains the speed (CAS) of the aircraft, estimated in accordance with the invention, within the interval $[V_{min}; V_{max}]$ with $V_{min} = V_{LS} + \sigma$ and $V_{max} = V_{MO} - \sigma$. This ensures that the aircraft remains inside its flight envelope with a probability of N %.

The method of the invention can also serve to check the correct operation of the anemometric subsystems. The reason is that, if the speed $CAS_M$ measured by said sensors differs from the speed estimated in accordance with the invention by more than $\sigma$ (as an absolute value), this signifies that there is a probability of N % that the measured value is erroneous. In this case, advantageously, only the estimated speed is used for piloting (automatic or manual) of the craft, and the pilot or pilots are warned of this fact.

Figure 3A:
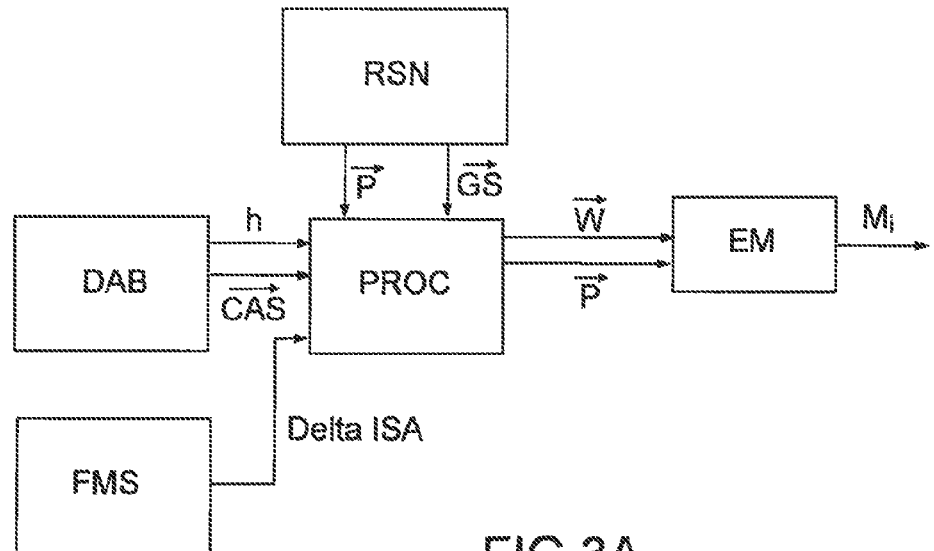
FIGS. 3A and 3B show the transmitter part and the receiver part, respectively, of a system according to an embodiment of the invention.
Figure 3B:
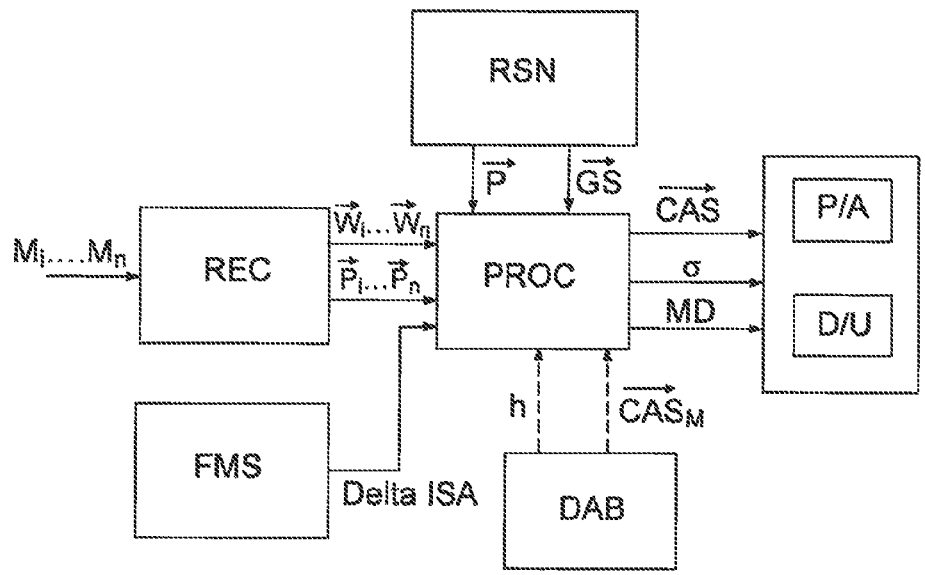

FIGS. 3A and 3B show a functional diagram of a system for implementing the method described above. For the sake of clarity, this system has been broken down into a transmitting subsystem (FIG. 3A), used by an assisting aircraft, and a receiving subsystem (FIG. 3B), used by an assisted aircraft. In general, an aircraft must be able to operate just as well assisting as assisted, and will consequently include both subsystems. Furthermore, the latter can share certain elements (indicated by the same references in both figures).

The transmitting subsystem in FIG. 3A comprises a processor PROC, a flight management system FMS, an anemometric or anemobarometric subsystem DAB, a GNSS receiver or an inertial station RSN and a transmitter, preferably of ADS-B type, EM. The processor PROC receives from the anemobarometric subsystem DAB a vectorial measurement of the airspeed $\vec{CAS}$ as well as an altitude value h; it receives from the device RSN an item of position information $\vec{P}$ and an item of ground speed information $\vec{GS}$; furthermore, it receives from the flight management system FMS an item of information DeltaISA, about the difference between the temperature measured outside the aircraft and the temperature of the standard atmosphere at the same altitude. The processor PROC uses these elements of information to compute the wind speed in the following way: h and DeltaISA make it possible to convert the conventional speed $\vec{CAS}$ into true speed $\vec{TAS}$, then the wind speed $\vec{W}$ is computed by using the vector difference between the ground speed and the TAS: $\vec{W} = \vec{GS} - \vec{TAS}$.

The wind speed computed thus and the position obtained directly by the device RSN are then communicated to the transmitter EM, which inserts them into a message $M_i$ that it transmits in broadcast mode. The transmission can be stopped if a fault in the anemobarometric subsystem is detected, indicating that the determined wind speed is not correct or reliable. In a variant, a "validity" field of the message can be used to indicate whether or not the transmitted item of information is correct and reliable.

The receiving subsystem in FIG. 3B itself also comprises a processor PROC (which may or may not be the same as that of the transmitting subsystem), a flight management system FMS, an anemometric or anemobarometric subsystem DAB, a GNSS receiver or an inertial station RSN, a receiver, preferably of ADS-B type, REC, an autopilot system P/A and/or a display system D/U.

The receiver REC receives a plurality of messages $M_1 \ldots M_n$ transmitted by the transmitting subsystems of other aircraft and extracts the position $\vec{P}_1 \ldots \vec{P}_n$ and wind speed $\vec{W}_1 \ldots \vec{W}_n$ items of information therefrom (the latter item of information being able to be replaced, as explained above, by values for ground speed and true airspeed), which are communicated to the processor. The latter uses these items of information, with the position and ground speed values obtained by the device RSN, to compute the speed TAS by applying the method described above. If the messages received comprise a validity field, the latter is checked and only the information considered to be valid is used. The processor likewise receives a DeltaISA value from the flight management system FMS and an altitude measurement h from the anemobarometric subsystem DAB, which make it possible to compute the corrected speed CAS; it also computes the uncertainty parameter σ. Furthermore, it can receive from the DAB a measured value of the corrected speed, $CAS_M$, and compare it with that estimated—and with the uncertainty parameter σ—so as to detect any fault in the anemobarometric subsystem. Depending on the result of this comparison, the processor transmits to the autopilot system P/A and/or to a display system D/U:

either the measured corrected speed $CAS_M$, if the DAB has not been identified as faulty;

or, in the opposite case, the estimated corrected speed, as well as its uncertainty parameter σ and an identifier MD signifying that piloting must be effected in "degraded mode", on the basis of an estimated and unmeasured speed.

In a variant, the processor can communicate with a ground station that carries out the computations, and mainly the interpolation enabling the wind speed to be determined.

The invention claimed is:

1. A method for determining an airspeed of an assisted aircraft, comprising the following steps:
    a) determining a position of said assisted aircraft;
    b) measuring a ground speed of said assisted aircraft;
    c) receiving a plurality of messages from a plurality of other aircraft, called assisting aircraft, each said message containing: a first item of information, indicating a position of a said assisting aircraft, and a second item of information, indicating a wind speed at said position;
    d) estimating a wind speed at the position of said assisted aircraft by interpolating the wind speed values at the positions of said assisting aircraft obtained in said step c); and
    e) computing a true speed TAS of said assisted aircraft by using a vector difference between its ground speed, measured in said step b), and the wind speed estimated in said step d), wherein:
    said steps a) and b) are implemented by at least one device aboard said assisted aircraft and chosen from among: a GNSS receiver and an inertial control centre;
    said step c) is implemented by a receiver aboard said assisted aircraft; and
    said steps d) and e) are implemented by a processor.

2. The method according to claim 1, also comprising the following step:
    f) computing, based on the true speed computed in said step e), at least one parameter chosen from among a Calibrated Air Speed CAS and a Mach number.

3. The method according to claim 1, wherein said steps a) and b) are implemented by means of at least one device (RSN) aboard said assisted aircraft and chosen from among: a GNSS receiver and an inertial control centre.

4. The method according to claim 1, wherein said messages are broadcast by said assisting aircraft.

5. The method according to claim 4, wherein said messages are broadcast by said assisting aircraft and received by said assisted aircraft according to an ADS-B protocol.

6. The method according to claim 1, wherein said second item of information comprises a ground speed measurement and an airspeed measurement for said assisting aircraft, from which said wind speed can be deduced.

7. The method according to claim 1, wherein at least said steps d) and e) are performed by a processor aboard said assisted aircraft.

8. The method according to claim 1, wherein said step d) is implemented by kriging.

9. The method according to claim 1, wherein said steps c) and d) comprise:
- receiving a predefined number N of said messages, extracting the first and second items of information contained in these messages and storing them in a queue of length N;
- computing a first estimation of said wind speed by interpolating from the information stored in said queue;
- on subsequently receiving other said messages, storing the information contained in said queue and concomitantly removing older information from said queue, according to the first in first out principle; and
- computing a new estimation of said wind speed by interpolating from the information stored in the queue modified thus.

10. The method according to claim 1, also comprising determining an uncertainty parameter of said airspeed of said assisted aircraft.

11. The method according to claim 1, wherein said messages also contain a third item of information representing the pressure at sea level corresponding to the position of each said assisting aircraft, the method also including a step of estimating the pressure at sea level corresponding to the position of said assisted aircraft by interpolating said third items of information.

12. A method for checking an operation of an anemometric subsystem aboard an aircraft, known as an assisted aircraft, comprising the following steps:
- measuring an airspeed of said assisted aircraft by means of said anemometric subsystem;
- determining said airspeed of said aircraft, as well as its uncertainty parameter, by using a method according to claim 9; and
- considering that said anemometric subsystem is faulty when a difference between said measured speed and said determined speed exceeds said uncertainty parameter.

13. A method for automatic piloting of an aircraft, called an assisted aircraft, including the following steps:
- i) determining an airspeed of said assisted aircraft as well as an uncertainty parameter of said speed by means of a method according to claim 12;
- ii) correcting upper and lower airspeed limits permitted for the flight of said aircraft while taking account of said uncertainty parameter; and
- iii) using an autopilot system to maintain the airspeed of said assisted aircraft within said corrected upper and lower limits.

14. Use of a method according to claim 1 in the event of a fault in an anemometric subsystem aboard said assisted aircraft.

15. A system for determining an airspeed of an aircraft, known as an assisted aircraft, comprising:
- a device for determining the position and ground speed of said aircraft;
- a receiver for receiving a plurality of messages from a plurality of other aircraft, known as assisting aircraft, each said message containing: a first item of information indicating a position of a said assisting aircraft, and a second item of information, indicating a wind speed at said position; and
- a processor configured or programmed for estimating a wind speed at the position of said assisted aircraft by interpolating wind speed values at the positions of said assisting aircraft and for computing the an airspeed of said assisted aircraft by using a vector difference between its ground speed and the estimated wind speed.

16. The system according to claim 15, also comprising an anemometric subsystem for determining a wind speed or the airspeed of the aircraft, as well as a transmitter for broadcasting a message containing: a first item of information, indicating a position of said aircraft, and a second item of information, indicating a wind speed at said position.

17. The system according to claim 15, wherein said receiver is an ADS-B receiver.

18. The system according to claim 16, wherein said receiver and said transmitter are an ADS-B receiver and transmitter respectively.

19. A method for determining an airspeed of an assisted aircraft, comprising:
- a) determining a position of the assisted aircraft with at least one device aboard the assisted aircraft chosen from among: a GNSS receiver and an inertial control centre;
- b) measuring a ground speed of the assisted aircraft with the at least one device;
- c) receiving a plurality of messages from a plurality of other aircraft, called assisting aircraft with a receiver aboard said assisted aircraft, each said message containing: a first item of information, indicating a position of a the assisting aircraft, and a second item of information, indicating a wind speed at the position;
- d) estimating a wind speed at the position of the assisted aircraft by interpolating the wind speed values at the positions of the assisting aircraft obtained in said step c) with a processor; and
- e) computing a true speed TAS of said assisted aircraft by using a vector difference between its ground speed, measured in said step b), and the wind speed estimated in said step d) with the processor.

\* \* \* \* \*